United States Patent
Wright, Jr.

(10) Patent No.: US 12,181,086 B2
(45) Date of Patent: Dec. 31, 2024

(54) END TERMINATIONS AND UNIONS FOR A HOSE CONSTRUCTION WITH A COUPLING HAVING A NON-METALLIC INSERT AND METHOD OF MAKING SAME

(71) Applicant: Specialty RTP, Inc., Stafford, TX (US)

(72) Inventor: John R. Wright, Jr., Stafford, TX (US)

(73) Assignee: Specialty RTP, Inc., Stafford, TX (US)

( * ) Notice: Subject to any disclaimer, the term of this patent is extended or adjusted under 35 U.S.C. 154(b) by 42 days.

(21) Appl. No.: 18/009,400

(22) PCT Filed: Jun. 4, 2021

(86) PCT No.: PCT/US2021/035826
§ 371 (c)(1),
(2) Date: Dec. 9, 2022

(87) PCT Pub. No.: WO2021/252275
PCT Pub. Date: Dec. 16, 2021

(65) Prior Publication Data
US 2023/0258288 A1    Aug. 17, 2023

Related U.S. Application Data

(60) Provisional application No. 63/036,708, filed on Jun. 9, 2020.

(51) Int. Cl.
*F16L 33/207*    (2006.01)
(52) U.S. Cl.
CPC ................. *F16L 33/2073* (2013.01)

(58) Field of Classification Search
CPC ..... F16L 33/20; F16L 33/207; F16L 33/2071; F16L 33/2073; F16L 33/2076; F16L 33/213
See application file for complete search history.

(56) References Cited

U.S. PATENT DOCUMENTS 3,843,169 A * 10/1974 Wise ..................... F16L 19/083
285/133.4
5,486,023 A    1/1996 Sanders et al.
(Continued)

FOREIGN PATENT DOCUMENTS

CA    3009423 A1 *  6/2017  ............ F16L 13/146
CA    3009436 A1 *  6/2017  ............ F16L 13/146
(Continued)

*Primary Examiner* — Aaron M Dunwoody
(74) *Attorney, Agent, or Firm* — Volpe Koenig

(57) ABSTRACT

A hose construction having a coupling secured to an end of a hose, with the coupling including a tubular insert formed with a polymer mixed with chopped reinforcement fiber and including first and second ends, with the first end being inserted in the hose, and the second end including a connector interface. A tubular metallic ferrule is connected to the tubular insert adjacent to the second end in order to form an annular hose receiving space between an outer surface of the insert and an inner surface of the ferrule. The end of the hose is received in the annular hose receiving space, and the ferrule is deformed inwardly against the hose to form a secure connection. The tubular insert formed of a non-metallic material has high strength and is resistant to corrosion due to contact with the materials being transported.

19 Claims, 3 Drawing Sheets

(56) References Cited

U.S. PATENT DOCUMENTS

| | | | |
|---|---|---|---|
| 5,707,152 A * | 1/1998 | Krywitsky | F16L 19/025 |
| | | | 374/208 |
| 5,853,202 A | 12/1998 | Li et al. | |
| 6,189,199 B1 | 2/2001 | Ouchi et al. | |
| 2005/0099005 A1 | 5/2005 | Fullbeck et al. | |
| 2006/0028020 A1* | 2/2006 | Fullbeck | F16L 33/2073 |
| | | | 285/256 |
| 2008/0001400 A1 | 1/2008 | Winzeler | |
| 2010/0001512 A1* | 1/2010 | Breay | F16L 25/021 |
| | | | 285/50 |
| 2010/0003840 A1* | 1/2010 | Breay | F16L 5/12 |
| | | | 439/88 |
| 2012/0228871 A1* | 9/2012 | Li | F16L 37/138 |
| | | | 285/307 |
| 2013/0183087 A1* | 7/2013 | Weibel | F16B 7/18 |
| | | | 428/34.5 |
| 2014/0124081 A1 | 5/2014 | Kanao | |
| 2015/0123394 A1 | 5/2015 | Breay et al. | |
| 2020/0049180 A1* | 2/2020 | Pollitt | B29C 53/566 |
| 2020/0271260 A1* | 8/2020 | Schaaf | F16L 37/138 |
| 2023/0258288 A1* | 8/2023 | Wright, Jr. | F16L 33/2076 |
| | | | 285/382 |

FOREIGN PATENT DOCUMENTS

| | | | | |
|---|---|---|---|---|
| CA | 3009479 A1 * | 6/2017 | | F16L 13/146 |
| GB | 2372788 A | 9/2002 | | |

* cited by examiner

END TERMINATIONS AND UNIONS FOR A HOSE CONSTRUCTION WITH A COUPLING HAVING A NON-METALLIC INSERT AND METHOD OF MAKING SAME

FIELD OF INVENTION

Embodiments of the present invention generally relate to corrosion resistant couplings, and more particularly to hose constructions including such corrosion resistant couplings that are assembled with a hose for use in the transport of highly corrosive acidic or caustic fluids or fluids acting as solvents, such as in oil and gas field applications.

BACKGROUND

It is known to use hose constructions that include a multi-layer polymeric hose that is connected with a metallic end fitting in various applications. These including, in particular, oil and gas field environments where the use of a polymeric hose enables long runs without couplings and a choice of polymers designed to handle the fluid materials being transported. However, in most oil and gas field applications, the material being transported, which can include unrefined or refined oil and gas products, is highly corrosive. While the polymeric hoses are resistant to solvents in the oil stream like aromatics and condensates, the couplings must also be made of corrosion resistant materials, such as Inconel, which are extremely expensive. To the extent that other metallic materials are used, they provide too short of a life in these applications resulting in premature failure of the hose construction at the coupling.

U.S. Pat. No. 5,486,023 discloses one hose construction in which a metallic coupling is provided including a tubular insert means that can be inserted into a tubular hose along with an outer ferrule. In this case, the insert is formed of a metallic material and is expanded outwardly in order to clamp the hose between the insert and the ferrule. This construction specifically requires a metallic insert in order to be expanded.

Hose constructions are also known having a coupling with a metallic insert located inside a tubular ferrule. This coupling is inserted onto the hose and with the hose material being trapped between the insert and the ferrule. The ferrule is then swaged or deformed inwardly trapping the hose against the insert in order to form the fluid tight connection.

In all of these known couplings, the insert is formed of metallic material in order to allow for expansion, or in order to have the required strength in order to allow a ferrule to be swaged and/or mechanically deformed around the insert, compressing the hose between the ferrule and the insert in order to form the connection.

It would be desirable to provide a coupling for use in corrosive and caustic applications (referred to herein as severe environments), including in oil and gas field applications where aromatics and condensates act on the coupling, for use in connection with polymeric hoses that is lower cost and provides higher reliability as well as resistance to the corrosive materials being transported through the hose constructions.

SUMMARY

In one aspect, a hose construction is provided that includes a hose having an inner peripheral surface and an outer peripheral surface. A coupling is secured to an end of the hose, with the coupling including a tubular insert formed with a polymer mixed with chopped reinforcement fiber and including first and second ends, with the first end being inserted in the hose, and the second end including a connector interface. A tubular metallic ferrule is connected to the tubular insert adjacent to the second end in order to form an annular hose receiving space between an outer surface of the insert and an inner surface of the ferrule. The end of the hose is received in the annular hose receiving space, and the ferrule is deformed inwardly against the hose to form a secure connection. This results in an assembly in which the fluid being transported is either in contact with the inside of the hose of the inside of the tubular insert which is now also formed of a non-metallic material having high corrosion resistance and the ability to resist degradation by severe environments.

In the preferred embodiment, this non-metallic insert is part of an end termination or union coupling, and the connector interface can be a threaded end, a raised flange or ring type joint, a union joint, or other coupling systems, such as a Victaulic end bead for connection using an external clamp.

The polymer used to form the insert is preferably PEEK, PEKK, PAEK, PPS, Epoxy Resin or is this embodied in the next sentence or mixtures thereof. Other polymers may also be used as long as they meet the required corrosion resistance and strength requirements for the application.

The polymer is preferably mixed with 18 wt % to 40 wt % of the chopped reinforcement fiber. In one embodiment where the chopped reinforcement fiber is chopped carbon fiber, the insert has a yield strength of at least 30,000 psi. More preferably, the yield strength is at least 45,000 psi. In other embodiments, the chopped reinforcement fiber can be chopped glass fiber, chopped aramid fiber, and or mixtures of any of the above. Other types of fiber may be suitable depending on the particular application.

Preferably, the ferrule is made of steel, and the insert preferably includes molded threads located on a portion thereof that are connected to threads on the tubular ferrule in order to form the coupling. Alternatively, a press-fit or tight fit between insert and ferrule can be used in order to allow for alignment so the pipe is centered before swaging.

In the preferred embodiment, the insert includes an area that is adapted to receive the hose, and this area includes a plurality of annular projections as well as a tapered end in order to allow for easier insertion. In the areas between these projections, the insert has a minimum wall thickness of 0.125 inches for a nominal 2 inch diameter hoes coupling. The wall thickness being reduced is important as in the case of a non-metallic insert, the inset cannot be outwardly expanded and the wall thickness reduces an internal clear through-flow area of the hose construction in comparison to the hose to some extent. Accordingly, minimizing the wall thickness while still providing the required strength and corrosion resistance is a desired feature.

The hose itself is preferably a multi-layer reinforced thermoplastic tube that is designed for the particular application. There is a particular need for a swaged coupling for attachment of a union or end termination since the coupling has to securely engage or "grab" the reinforcement in order to lock the union or end termination in place.

In another aspect, a method of forming a coupling for a hose construction is also provided. The method includes blending a polymer and chopped reinforcement fiber to form a molding compound. This molding compound is then formed into the tubular insert, which includes the first and second ends as noted above. The forming can be by injection molding, compression molding, or machining the insert from solid bar stock formed of the molding compound. The first end is configured for insertion into the hose and the second end includes a connector interface. The coupling is assembled by connecting a tubular metallic ferrule to the tubular insert adjacent to the second end in order to form an annular hose receiving space between an outer surface of the insert and an inner surface of the ferrule. The materials used for the tubular insert are preferably those discussed above in order to form the molding compound, including a PEEK, PEKK, PAEK, PPS, or other similar polymer or mixtures thereof that are mixed with 18 wt % to 40 wt % of the chopped reinforcement fiber.

In order to form the hose construction, the coupling is inserted on to the end of the hose with the hose being received in the annular hose receiving space between the insert and the ferrule. A hydraulic swaging machine then cold draws (swages) the outer ferrule, compressing it against the tubing which is pressed further inwardly against the insert in order to lock the pipe in place and form a secure connection for a union or end termination.

This construction provides superior corrosion resistance in severe oil and gas field applications and is resistant to $H_2S$, $CO_2$, aromatics, hydrocarbons, brine/salt water, as well as being temperature resistant to high temperatures for example up to 160° C.

Additional features of the hose construction and its method of production are described in further detail below and in the claims.

BRIEF DESCRIPTION OF THE DRAWINGS

The foregoing Summary as well as the following Detailed Description will be better understood when reviewed in conjunction with the appended Figures which show exemplary embodiments of the invention. As the Figures are only intended to show exemplary embodiments, they should not be considered limiting with respect to the scope of the invention. In the drawings.

DETAILED DESCRIPTION

Figure 1:
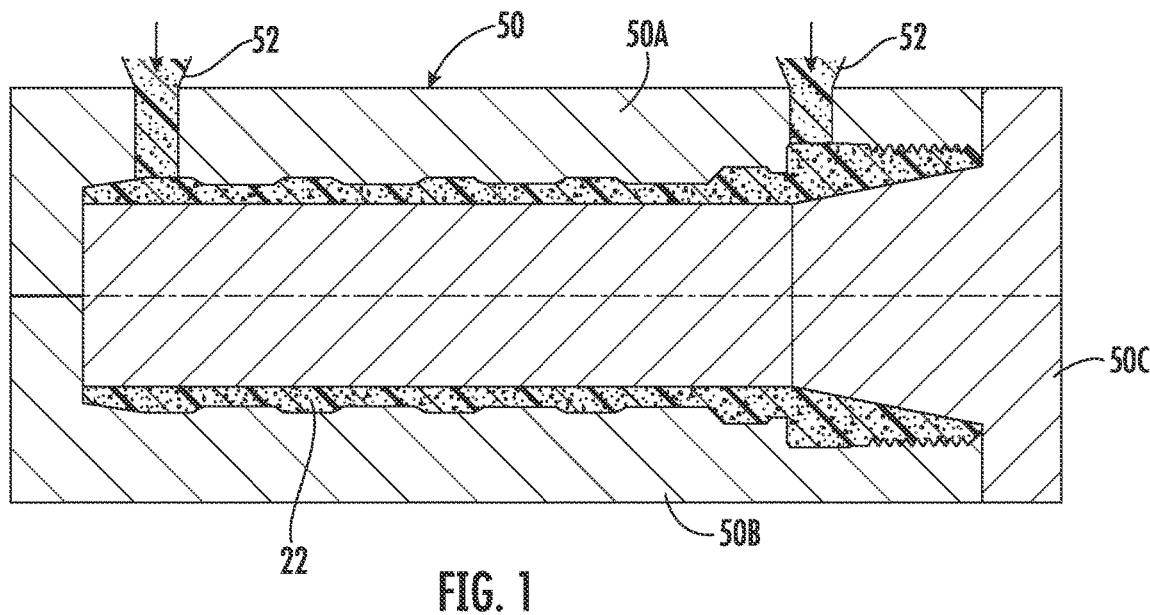
FIG. 1 is a cross-sectional view showing an injection mold with a tubular insert used in the coupling according to the invention located therein as part of a molding process.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivatives thereof, and words of similar import. Additionally, the figures are not drawn to scale and may be simplified for clarity. The terms "approximately" and "about" include +/−10% of the indicated value.

While the present hose construction is described in reference to a flexible pipe system for conveyance of petroleum or natural gas materials, the present invention may be modified for a variety of other applications while remaining within the spirit and scope of the claimed invention, since the range of the potential applications is great, and because it is intended that the present invention be adaptable to many such variations.

As used in the present disclosure, "petroleum materials" and variations thereof as used herein includes both naturally occurring unprocessed crude oil, natural gas, and hydrocarbon containing products, including any impurities occurring naturally or introduced during extraction of the crude oil and natural gas, and refined crude oil and gas products. As recited in the present disclosure, "flexible" as used to describe the pipe used with the pips system means capable of assuming a radius of curvature less than or equal to about 10 feet without collapsing or kinking. The terms "pipe" and "hose" are both used to describe a tube used to convey water, gas, oil, or other fluid substances are intended to have their broadest meaning, and are used synonymously.

Figure 3:
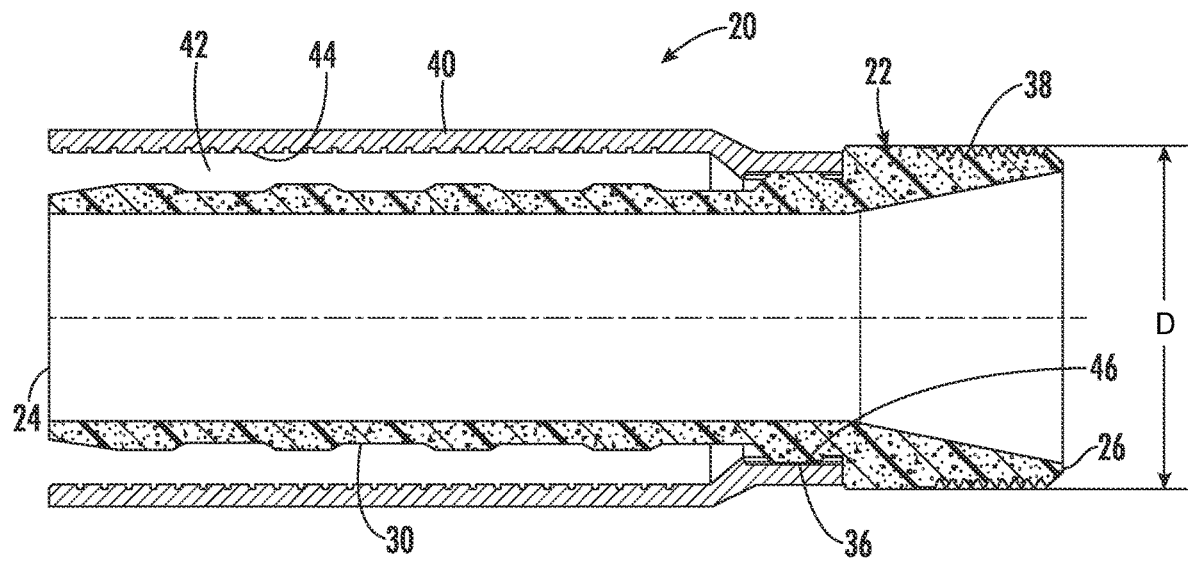
FIG. 3 is a cross-sectional view through a coupling assembly including the non-metallic insert and a ferrule.
Figure 4:
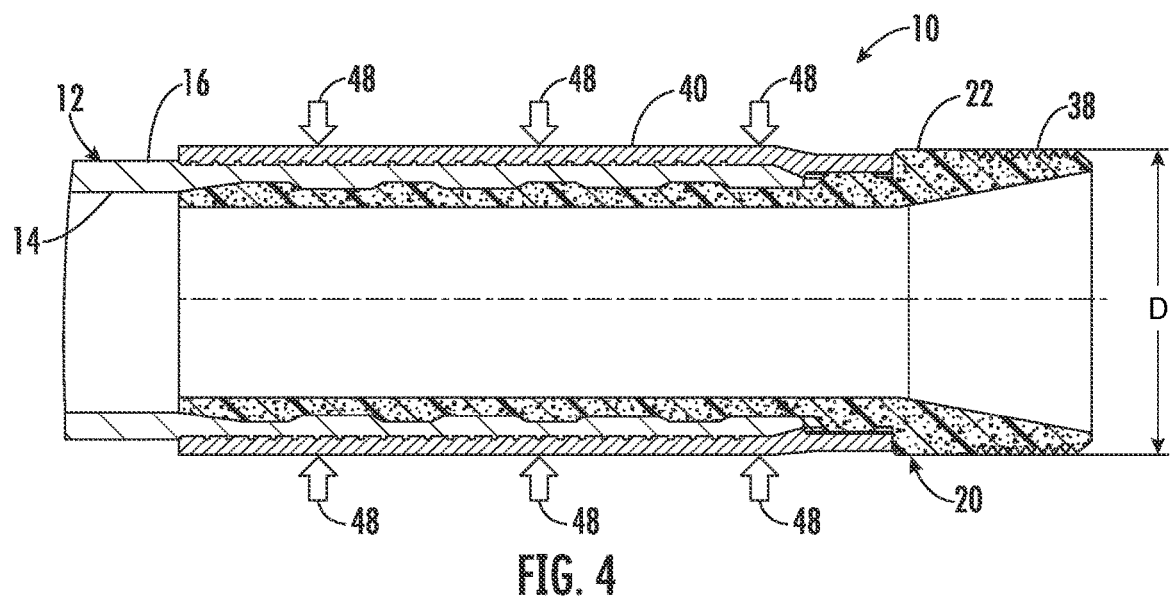
FIG. 4 is a cross-sectional view through an assembled hose construction including the coupling shown in FIG. 3 and a hose.

Referring to FIG. 4, a hose construction 10 is provided according to a first embodiment. The hose construction 10 includes a hose 12 having an inner peripheral surface 14 and an outer peripheral surface 16. A coupling 20, shown in detail in FIG. 3 is secured to an end of the hose 12. The coupling 20 includes a tubular insert 22, shown in detail in FIG. 2, formed of a polymer mixed with chopped reinforcement fiber. The polymer is preferably PEEK, PEKK, PAEK, PPS, or mixtures thereof. However, those skilled in the art will recognize that other polymers can be used depending upon the material to be carried via the hose construction.

The polymer is mixed with about 18 wt % to 40 wt % of the chopped reinforcement fiber, which in one embodiment is chopped carbon fiber. Other reinforcement fibers such as chopped glass fiber or chopped aramid fiber and/or mixtures including one or more of the above can be used depending on the application. More preferably, the chopped reinforcement fiber is provided from 25 wt % to 38 wt %, and most preferably, the chopped reinforcement fiber is between 30 wt % and 36 wt %.

Figure 2:
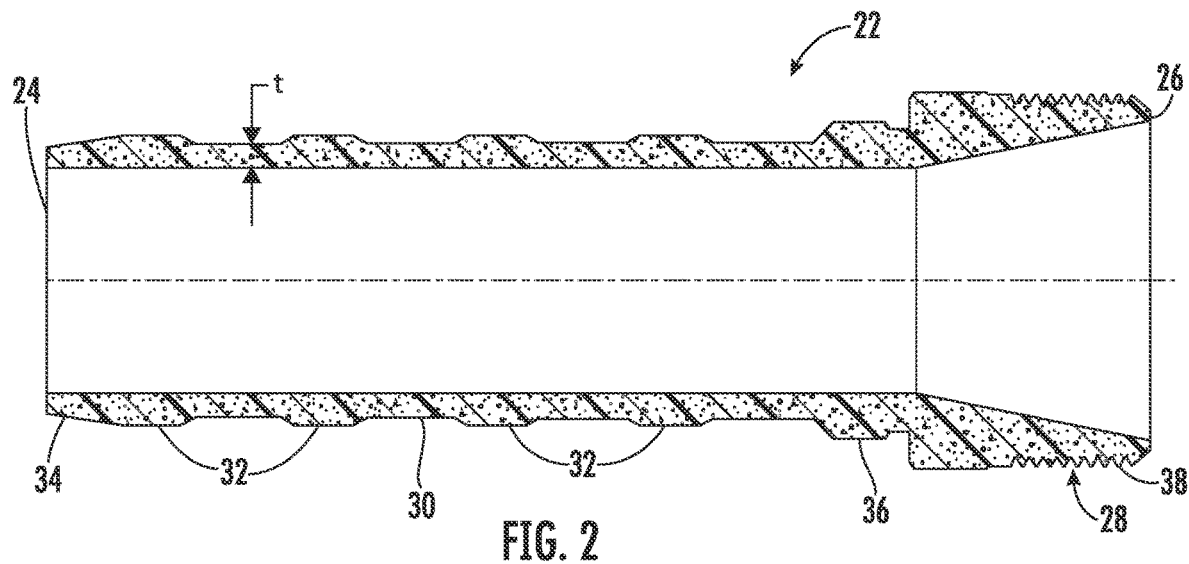
FIG. 2 is a cross-sectional view through a non-metallic insert, which could be for example a molded insert after removal from the mold shown in FIG. 1.

As shown in FIGS. 2-4, the tubular insert 22 includes a first end 24 and a second end 26. The first end 24 is inserted in the hose 12 and the second end 26 includes a connector interface 28. The connector interface shown is a threaded connection 38. However, other types of connector interfaces that are known to the skilled artisan can also be used, such as a raised flange or ring type flange, a union, a raised connection for a Victaulic connector, etc. These are adapted to form a union or an end termination.

As shown in FIG. 3, a tubular metallic ferrule 40 is connected to the tubular insert 22 adjacent to the second end 26 in order to form an annular hose receiving space 42 between an outer surface 30 of the insert 22 and an inner surface 44 of the ferrule 40. Preferably, the insert 22 includes threads 36, which can be molded if the insert 22 is molded, that are connected to threads 46 on the tubular metallic ferrule 40 in order to form this connection As shown in FIG. 4, the end of the hose 12 is received in the annular hose receiving space 42 and the ferrule 40 is deformed inwardly, as indicated by arrows 48, against the hose 12 pressing the hose 12 against the tubular insert 22 to form a secure connection.

The tubular insert 22 is required to have a high strength in order to withstand the inward deformation or swaging of the metallic ferrule 40 and preferably has a yield strength of at least 30,000 psi. More preferably, the yield strength is at least 45,000 psi. In one preferred embodiment using PEEK resin and between about 30 and 36 wt % of the chopped carbon fiber, the tubular insert 22 has a yield strength of over 50,000 psi.

Referring to FIG. 2, the insert 22 preferably includes annular projections 32 in the hose insertion area in order to anchor the hose 12 and prevent pull-out. Further, a tapered end 34 is provided at the first end 24 in order to allow for easier insertion into the end of the hose 12. In a preferred embodiment, a thickness t of the wall of the insert in the hose insertion area is about 0.125 inches for a nominal 2 inch diameter hose coupling 20. For a nominal 4 inch diameter hose coupling the thickness t of the wall of the insert in the hose insertion area is about 0.25 inches in order to be able to withstand the force required for inward deformation or swaging of the metallic ferrule 40. Those skilled in the art will understand from the present disclosure that the thickness t will vary depending on the coupling diameter.

Reducing the thickness t of the tubular insert 22 as much as possible based on the high yield strength of the molding compound formed from chopped reinforcement fiber and polymer while still maintaining the structural integrity to provide as large a clear through-flow area as possible through the coupling is important because the tubular insert 22 extends into the I.D. of the hose 12, and the greater the thickness, the more the flow is obstructed.

As shown in FIG. 4, the hose 12 is preferably a flexible, multi-layer thermoplastic pipe formed of a suitable material that is resistant to the severe environments in which the hose construction 10 is used.

Figure 5:
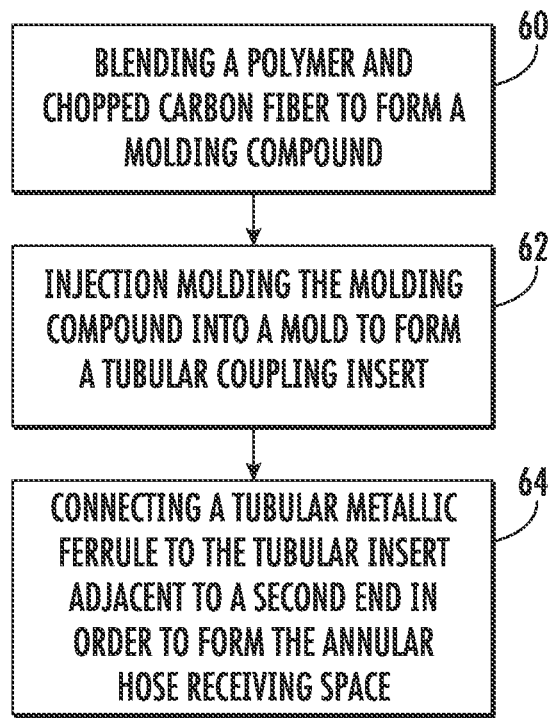
FIG. 5 is a flow chart showing a method of forming a coupling according to the invention.

Referring to FIGS. 1 and 5, a method for forming a coupling 20 for a hose construction 10 is provided. The method includes blending a polymer and chopped reinforcement fiber, preferably chopped carbon fiber, to form a molding compound, as indicated at 60 in FIG. 5.

This molding compound is then injection molded into a mold 50, for example as shown in FIG. 1, to form the tubular insert 22 as discussed above. This is indicated at step 62 in FIG. 5. The mold 50 is preferably a multi-part mold and includes at least two outer mold components 50A, 50B and an insert 50C that forms the I.D. of the tubular insert 22. Sprues are provided on the mold 50 in order to allow the molding compound to be injection molded. The sprues 52 shown in FIG. 1 are intended to be merely exemplary, and multiple sprues and vents can be provided, depending upon the size of the coupling insert being formed.

While injection molding is one method of forming the insert 22, it can also be compression molded or machined from solid bar stock formed or extruded from the molding compound.

As shown in FIG. 3, the tubular metallic ferrule 40 is connected to the tubular insert 22 adjacent to the second end 26 in order to form the annular hose receiving space 42 between the outer surface 30 of the insert 22 and the inner surface 44 of the ferrule 40. This is indicated at step 64 in FIG. 5.

Figure 6:
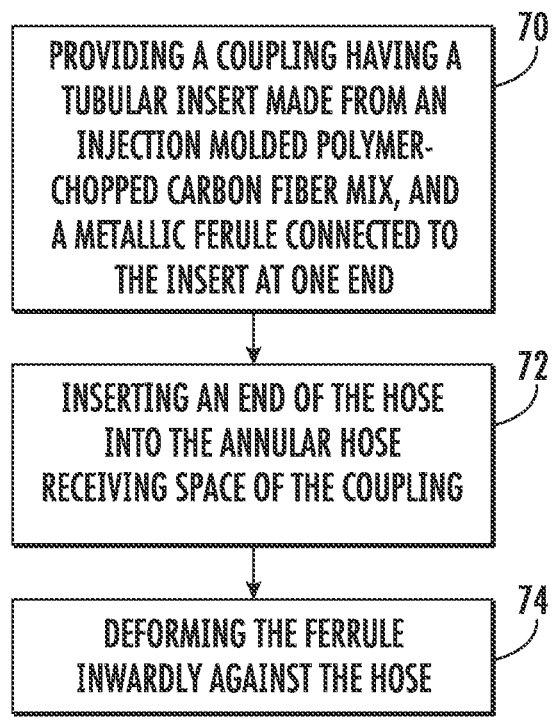
FIG. 6 is a flow chart showing a method of forming a hose construction according to the invention.

Referring to FIG. 6, a method of forming a hose construction 10 according to one embodiment of the invention is also provided. As indicated at 70, the coupling 20 according to the method discussed above is provided. As indicated at 72, an end of the hose 12 is inserted into the annular hose receiving space 42 of the coupling 20.

Then, as indicated at indicated at 74, the ferrule 40 is deformed inwardly against the hose 12 to form a secure connection between the hose 12 and the insert 22, preferably in a cold forming or swaging process.

This provides a field installable coupling 20 for use with a union or an end termination that can be installed on a hose 12 in a desired position and then swaged on to the hose end using a portable hydraulic swaging machine that cold draws a die over the outer ferrule 40 in order to swage the ferrule 40 inwardly, compressing the hose 12 against the tubular insert 22, to lock the coupling 20 in place on the end of the hose 12. The connection is made more secure via the annular projections 32 on the tubular insert 22 and can be further enhanced by providing annular or threaded grooves on the inner surface 44 of the ferrule 40, as shown in FIG. 3.

In the hose construction 10, the materials being conveyed therefore are in contact with the inside of the polymeric hose 12 or the tubular insert 22 that is formed of fiber reinforced resin, eliminating contact with metallic coupling parts that would need to be formed of high cost materials in order to prevent corrosion and premature failure.

Having thus described various embodiments of the present hose construction in detail, it will be appreciated and apparent to those skilled in the art that many changes, only a few of which are exemplified in the detailed description above, could be made in the hose construction according to the invention without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A hose construction, comprising:
a hose having an inner peripheral surface and an outer peripheral surface, and
a coupling secured to an end of said hose, the coupling including
a tubular insert formed of a polymer mixed with chopped reinforcement fiber and including first and second ends, the first end being inserted in the hose, and the second end including a connector interface, and
a tubular metallic ferrule that is connected to the tubular insert adjacent to the second end in order to form an annular hose receiving space between an outer surface of the insert and an inner surface of the ferrule,
wherein the end of the hose is received in the annular hose receiving space and the ferrule is deformed inwardly against the hose to form a secure connection.

2. The hose construction of claim 1, wherein the insert has a yield strength of at least 30,000 PSI.

3. The hose construction of claim 1, wherein the insert has a yield strength of at least 45,000 PSI.

4. The hose construction of claim 1, wherein the polymer used to form the insert is Polyetheretherketone, Polyetherketoneketone, Polyaryletherketone, Polyphenylene Sulfide, or mixtures thereof.

5. The hose construction of claim 4, wherein the polymer is mixed with 18 wt % to 40 wt % of the chopped reinforcement fiber.

6. The hose construction of claim 1, wherein the chopped reinforcement fiber is at least one of chopped carbon fiber, chopped aramid fiber, or chopped glass fiber.

7. The hose construction of claim 1, wherein the insert has a wall thickness in a hose insertion area of about 0.125 inches.

8. The hose construction of claim 1, wherein the hose is a multi-layer reinforced thermoplastic tube.

9. The hose construction of claim 1, further comprising molded threads located on the tubular insert that are connected to threads on the tubular metallic ferrule.

10. A method of forming a coupling for a hose construction, the method comprising:
   blending a polymer and chopped carbon fiber to form a molding compound;
   forming a tubular insert from the molding compound including first and second ends, the first end being configured for insertion into a hose, and the second end including a connector interface; and
   connecting a tubular metallic ferrule to the tubular insert adjacent to the second end in order to form an annular hose receiving space between an outer surface of the insert and an inner surface of the ferrule.

11. The method of claim 10, wherein the forming comprises injection molding.

12. The method of claim 10, wherein the forming comprises compression molding.

13. The method of claim 10, wherein the forming comprises machining from extruded bar stock formed from the molding compound.

14. The method of claim 10, wherein the polymer used to form the insert is Polyetheretherketone, Polyetherketoneketone, Polyaryletherketone, Polyphenylene Sulfide, or mixtures thereof.

15. The method of claim 10, wherein the chopped reinforcement fiber is at least one of chopped carbon fiber, chopped aramid fiber, or chopped glass fiber.

16. The method of claim 10, further comprising mixing the polymer with 18 wt % to 40 wt % of the chopped carbon fiber.

17. The method of claim 16, further comprising forming a wall thickness of the tubular insert in a hose insertion area of 0.125 inches.

18. A method of forming a hose construction, comprising:
   forming the coupling according to the method of claim 10;
   inserting an end of a hose in the annular hose receiving space; and
   deforming the ferrule inwardly against the hose to form a secure connection.

19. A coupling configured for connection to a polymeric hose, the coupling comprising:
   a tubular insert formed of a polymer mixed with chopped reinforcement fiber and including first and second ends, the first end being configured for insertion into an end of the hose, and the second end including a connector interface, and
   a tubular metallic ferrule connected to the tubular insert adjacent to the second end in order to form an annular hose receiving space between an outer surface of the insert and an inner surface of the ferrule,
   wherein the ferrule is configured to be deformed inwardly against the hose to form a secure connection.

* * * * *